US007499030B2

United States Patent
Metelko

(10) Patent No.: US 7,499,030 B2
(45) Date of Patent: Mar. 3, 2009

(54) GRAPHICS INITIALIZATION FOR WIRELESS DISPLAY DEVICES

(75) Inventor: Mary A. Metelko, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1150 days.

(21) Appl. No.: 10/301,417

(22) Filed: Nov. 21, 2002

(65) Prior Publication Data

US 2003/0103570 A1    Jun. 5, 2003

Related U.S. Application Data

(60) Provisional application No. 60/334,667, filed on Nov. 30, 2001.

(51) Int. Cl.
*G06F 3/02* (2006.01)

(52) U.S. Cl. .................. 345/169; 345/156; 345/158

(58) Field of Classification Search ........... 345/1.1–1.3, 345/2.1–2.2, 3.1–3.4, 689–690, 214, 156–169; 359/290–291
See application file for complete search history.

(56) References Cited

U.S. PATENT DOCUMENTS

2003/0017846 A1 *   1/2003   Estevez et al. ............... 455/556

* cited by examiner

*Primary Examiner*—Richard Hjerpe
*Assistant Examiner*—Mansour M Said
(74) *Attorney, Agent, or Firm*—Charles A. Brill; Wade James Brady, III; Frederick J. Telecky, Jr.

(57) ABSTRACT

A method of optimizing bandwidth of a wireless link between a display device and an image data player. The display device is configured with one or more features that affect its bandwidth capacity. This configuration results in one or more "bandwidth reduction parameters". The display device is programmed to communicate these parameters to the player via the wireless link, so that the player can deliver device-specific image data to the display device.

18 Claims, 1 Drawing Sheet

GRAPHICS INITIALIZATION FOR WIRELESS DISPLAY DEVICES

This application claims priority under 35 USC § 119(e)(1) of provisional application No. 60/334,667 filed Nov. 30, 2001.

TECHNICAL FIELD OF THE INVENTION

This invention relates to wireless display devices, and more particularly to interfacing the display device to the source image player.

BACKGROUND OF THE INVENTION

For image display applications, a projector and the source of the desired image data are rarely incorporated into the same piece of equipment. Because of this, setting up a projector for viewing requires an element of planning and preparation not encountered in other types of image display systems. When the link between the projector and the image source is wired, consideration must be given to cabling requirements.

As projectors continue to shrink in size and portability, it is more desirable to untether the projector from the image source. For this reason, wireless projectors are increasingly in demand.

A problem with using a wireless link between the projector and the image source is bandwidth limitation. As compared to the bandwidths of wired links, the bandwidths of today's wireless links are orders of magnitude less.

Early solutions to the wireless link, in the form of wireless networks, tended to be proprietary. A bandwidth of 54 Mbps has been considered high for RF wireless networks. RF links typically carry about a 40% overhead for protocol information exchange and error resilience measures, thus the effective bandwidth for data throughput is approximately 32 Mbps.

Various newer RF networking technologies have emerging, targeting home or corporate environments or both. Even so, the bandwidth available today for RF networking does not meet the data throughput needs of image sources. The home entertainment industry has dealt with the difference in interface capability by using data compression techniques. Another approach is to transfer graphic commands rather than raw data between the image source and the display device.

SUMMARY OF THE INVENTION

One aspect of the invention is a method of communicating image data from an image data player to a display device. It is assumed that the image data player is programmed to transform the image data in accordance with various display device parameters. The display device is programmed to wirelessly transmit certain bandwidth reduction parameters from the display device to the player. These bandwidth reduction parameters comprise at least parameters representing flow control, storage capacity, and rendering capability of the display device. After the player transforms the image data in accordance with the parameters, the display device wirelessly receives the transformed image data from the player, and renders an image based on the image data.

An advantage of the invention is that information is exchanged between a source player and a display device about bandwidth reduction methods employed by the display device. This permits the wireless link to be optimized. It also furthers flexibility and customization of display devices, in accordance with their desired content, price point, and feature set.

DETAILED DESCRIPTION OF THE INVENTION

Bandwidth Reduction Parameters

Figure 1:
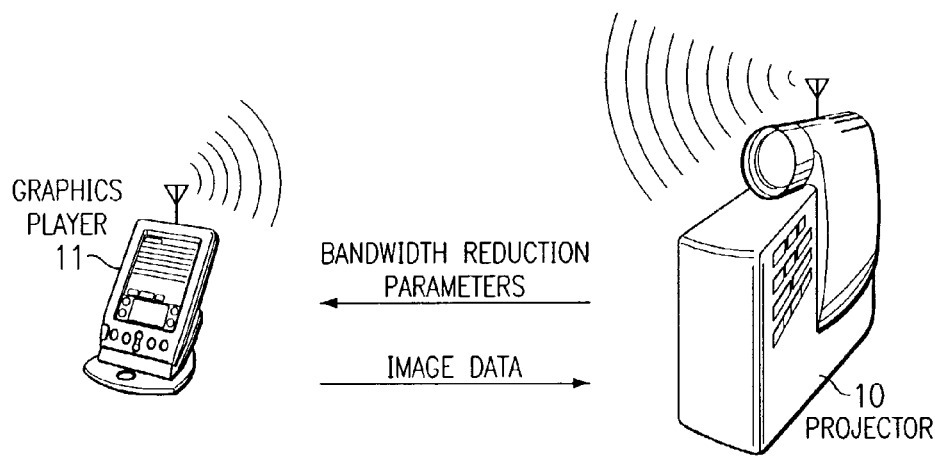
FIG. 1 illustrates a display device having a wireless connection to a graphics player in accordance with the invention.

FIG. 1 illustrates a display device 10 having a wireless connection to a graphics player 11 in accordance with the invention. The display device 10 receives data representing content to be displayed, including image data, from player 11. The display device 10 may also be remotely controlled from the player 11.

The image data transmitted from player 11 to display device 10 represents still or motion images to be displayed on the display device. For example, if display device 10 is a projector, the image data might represent slides for a presentation to be projected onto a display screen.

In the example of FIG. 1, display device 10 is a projection display having SLM (spatial light modulator) type display electronics. For example, display device 11 might be a device whose images are generated by a spatial light modulator, such as an LCD array or a DMD (digital micromirror device) array. However, the same concepts could be applied to a CRT display having appropriate digital to RBG conversion capability. In any event, it is assumed that display device 11 is capable of receiving digital image via a wireless link and of converting the data to a format suitable for its particular display electronics. Also, as further explained below, display device 10 has electronic transmitting and interface circuitry for transmitting "bandwidth reduction parameters" to player 11.

For purposes of example herein, player 11 is a mobile computing device, such as personal digital assistant (PDA). It has appropriate electronic circuitry for wirelessly transmitting image data to display device. Also, for purposes of the present invention, it has receiving circuitry for wirelessly receiving "bandwidth reduction parameters". The wireless link is typically an RF link, but an optical link is also possible.

With regard to the image data, player 11 may either transmit the image data from mass storage within internal memory or as buffered data received from an external source to display device 10. As examples, in the former case, the data may be stored on a disk, and in the latter case, the data may be received from the Internet. It is further assumed that player 11 has appropriate processing circuitry and associated memory for transforming the source image data into image data specific to the display device, in accordance with the particular configuration of the display device, including the bandwidth reduction parameters discussion herein.

Examples of other types of mobile players 11 suitable for transferring image data to display device 10 are cell phones and notebook computers. Alternately, the player 11 could be some other computer equipment, such as a desktop computer. Home entertainment applications are also possible, such as with a satellite receiver or DVD player. Regardless of the origin of the image data, it is assumed that player 11 has transmitting circuitry for wirelessly transmitting the image data to display device 10.

As indicated in the Background, today's display devices 10 employ various solutions to reduce the bandwidth needed to receive image data. As a result, configurations of the display device vary based on factors such as the type of intended content, cost tradeoffs, and the bandwidth of the wireless interface. Solutions to bandwidth limitations affect at least three categories of configurations within display device 10: flow control, storage capacity, and graphic rendering. These parameters are collectively referred to herein as "bandwidth reduction parameters".

A feature of the invention is the transmission from display device 10 to player 11 of its display configurations, specifically, its bandwidth reduction parameters. As explained below, this permits player 11 to transfer device-specific data to display device 10, with the data optimized for bandwidth usage.

With respect to flow control, some sources and wireless transmission methods may result in a link rate that varies over time. Also, as interference increases, the line rate decreases and more data may need to be buffered. Flow control information could include an indication of the buffer size within display device 11, so as to permit the player 11 to allocate the same amount. Information about other flow control measures could also be communicated.

Storage capacity information could include the size of storage available on the display device 10. Some display devices 10 may be capable of accepting internal memory upgrades, such as compact flash cards. Information can be communicated to indicate the amount of data that display device 10 can receive before becoming overloaded. Information could be shared about currently used memory and remaining memory available.

With respect to graphics rendering capability, there are several possible configurations that reduce data bandwidth needs. These include image compression, file transfer, and graphic command exchange. Image compression can be performed in different ways based on the content data characteristics. Data that is compressed is decompressed using reverse techniques. Therefore, the player 11 must be apprised of the decompression methods available at display device 10 in order to provide useable data to display device 10. Examples of potential compression methods are MPEG2, JPEG, wavelets, partial or full image compression, as well as various non-standard methods. For file transfer, player 11 may be apprised of the types of files that can be accepted by display device 10, such as powerpoint, word, or pdf files. Graphics command exchange could be non-existent, simplistic 2D graphic commands (such as lines, rectangles, circles, text, color, and fill), or high end 3D commands (such as those for lighting, affine transformations, and shading calculations).

Figure 2:
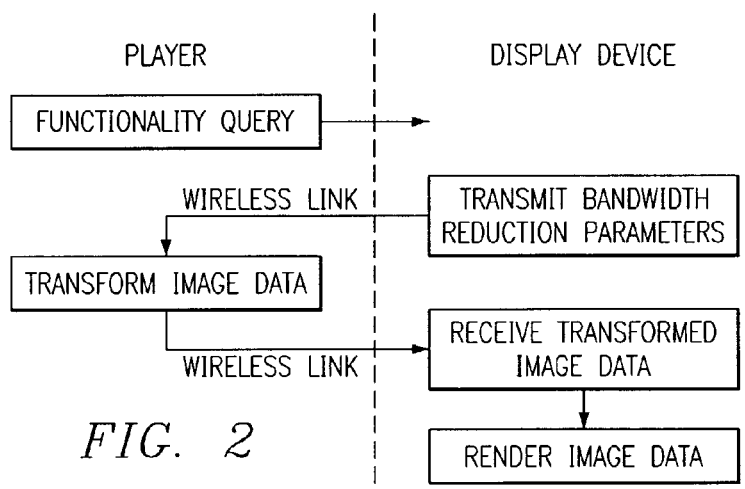
FIG. 2 illustrates the wireless data flow between the player and the display device.

FIG. 2 illustrates the data flow between the display device 10 and the player 11. Player 11 first delivers and query of functionality, to which display device 10 responds. As indicated, the player 11 transforms the image data in accordance with the bandwidth reduction parameters received from the display device 10. This results in device-specific data transfer, which optimizes the bandwidth constraints of the wireless link between the two devices. For example, if display device 10 communicates that it has graphics rendering capability, player 11 can transmit graphics data, thereby using less bandwidth. On the other hand, if display device 10 requires bit mapped data, player 11 will transmit appropriate image data. As another example, if display device 10 communicates that it has ample storage, player 11 can increase bandwidth accordingly or send files that can be stored and decoded at the display device. Player 11 can use flow control information to modify data transfer rates.

Example of Display Device Configured for Bandwidth Reduction Data Exchange

Figure 3:
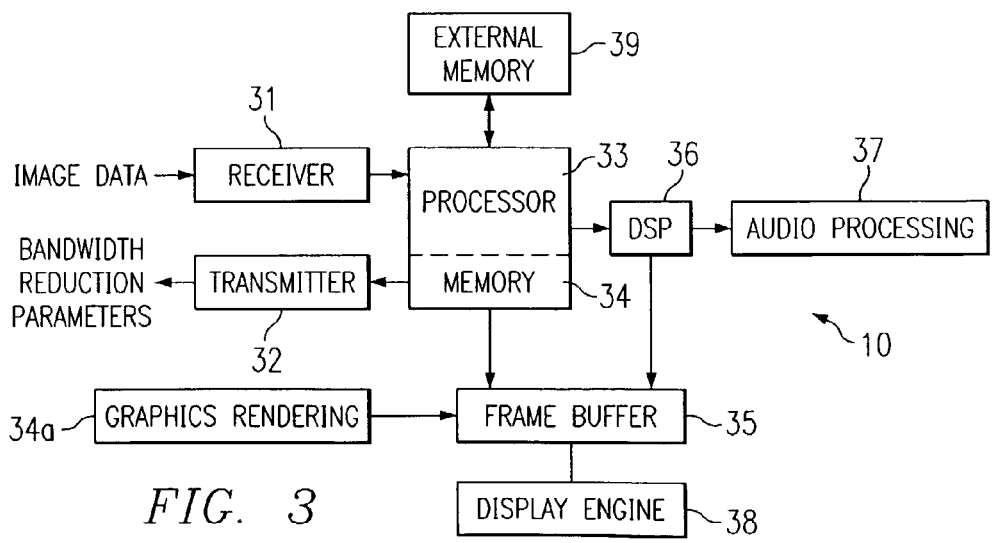
FIG. 3 illustrates the internal components of a display device in accordance with the invention.

FIG. 3 is a block diagram of the internal components of display device 10, configured to receive and display image data from player 11 in accordance with the invention. Only those components that play a role in the image data path are shown; display device 10 might have additional features, such as those associated with a user interface features.

An RF receiver 31 image data from player 11. As an example, receiver 31 may be implemented in accordance with the "Bluetooth" (TM) standard, which refers to a set of open specifications for wireless communications of data and voice. Alternatively, receiver 31 may be implemented with some other wireless standard, such as the IEEE 802.11A, 802.11B, IrDA (Infrared Data Association), or HomeRF standards. A transmitter 32 transmits bandwidth reduction parameters in the manner discussed above.

As indicated in FIG. 3, receiver 31 delivers image data to microprocessor 33. It may also transmit files containing image data to memory 34. Memory 34 may be any type of memory, such as a plug-in type memory, i.e., flash or smart memory.

Microprocessor 33 receives data from receiver 31. In the case where player 11 receives Internet content, image data may be received by browser application programming, which may be implemented with conventional programming used for displaying web pages or may be a "micro-browser" of the type associated with computing devices specialized for internet access. More sophisticated browsers can present multimedia, which includes sound and video, as well as graphics.

Essentially, processor 33 interprets the image data, including any special files, such as JPEG or animation files. It interprets any graphics commands, which then control its operation.

Processor 33 may be implemented in the manner most appropriate for the display engine 38. Its memory system may be include external memory 39 as well as internal memory. In the embodiment of FIG. 2, graphics rendering may be performed with by a specialized graphics rendering unit 34*a*. Alternatively, microprocessor 33 might be implemented as a larger chip set or ASIC that also includes a graphics rendering engine. Various other implementations for graphics rendering are possible.

Microprocessor 33 is further programmed with drivers that translate operating system commands into hardware specific commands. The data passed from microprocessor 33 to frame buffer 35 is in the form of pixel data suitable for display rendering. Any specialized formatting, such as the "bit plane" formatting used by DMD-type display engines may be performed by processor 33, by the manner of reading into or writing from frame buffer 35, or by additional software or hardware.

If the image data arrives as compressed data, such as JPEG files, a special digital signal processing (DSP) unit 36 may be used to perform decompression tasks. DSP unit 36 may be programmed to operate on both image data and audio data. Audio processing unit 37 handles presentation of audio data. The use of a separate DSP unit 36 to offload compression tasks from microprocessor 33 reduces graphics rendering time.

The image data from microprocessor 33 or DSP unit 36 is stored in a frame buffer 35 prior to display. Frame buffer 35 may be any type of memory, with data stored and accessed in a manner appropriate for display engine 26.

Display engine 38 contains some sort of image generation device. Examples of suitable image generation devices are spatial light modulators, such as liquid crystal arrays or digital micromirror device (DMD) arrays. The latter is commercially available from Texas Instruments, Incorporated. Display engine 38 has whatever optics and electronics associated with the particular image generation device.

Standardization of Bandwidth Reduction Parameter Exchange

The above-described transfer of bandwidth reduction parameters from display device 10 to player 11 could be standardized. Existing standards for the exchange of graphic capability between computing devices and displays could be extended to include the information described above.

For example, it could be assumed that display device 10 and player 11 operate in accordance with the Enhanced Extended Display Identification Standard (E-EDID) developed by the Video Electronics Standards Association (VESA). VESA has recently announced various enhancements for existing standards for computer displays. The standards address current limitations that exist with monitor detection by the computer, add newer display resolutions and refresh rates and address signal integrity issues that exist from the continued usage of the signal path used between video cards and display devices. Specifically, the Enhanced Extended Identification Data (E-EDID) standard defines data formats used by the display device to communicate its identity and capabilities to the computer and operating system. The Enhanced Display Data Channel (E-DDC) standard defines the actual communications channel between the computer and display device. It is a bi-directional channel used to carry configuration and control info and monitor functions that may affect the displayed images. This new enhanced E-DDC standard can address a larger set of data compared to the older DDC standard.

The EDID standard is a display interface standard, not concerned with the transport layer that determines whether the link between the display device and the player is wired or wireless. Thus, a feature of the invention is an extension of the EDID display interface standard for use with wireless links.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A method of communicating image data from an image data player to a display device, the image data player programmed to transform the image data in accordance with display device parameters, comprising the steps of:

transmitting bandwidth reduction parameters from the display device to the player, the bandwidth reduction parameters comprising at least parameters representing flow control, storage capacity, and rendering capability of the display device; and receiving transformed image data from the player in the display device;

wherein the transmitting and receiving steps are performed via a wireless link.

2. The method of claim 1, wherein the transmitting and receiving steps are in accordance with a wireless communications standard.

3. The method of claim 1, wherein the bandwidth reduction parameters are communicated in accordance with a communications standard.

4. The method of claim 3, wherein the standard is the extended display identification standard.

5. The method of claim 1, wherein the display device is a projection device.

6. The method of claim 5, wherein the display device is a micromirror device-based projection device.

7. The method of claim 5, wherein the display device is an LCD-based projection device.

8. The method of claim 1, wherein the wireless link is a radio frequency (RF) link.

9. The method of claim 1, wherein the wireless link is an optical link.

10. A wireless display device that receives image data from a player programmed to transform image data in accordance with display device parameters, the display device comprising:

a transmitter operable to transmit bandwidth reduction parameters to the player via a wireless link;

a receiver operable to receive transformed image data from the player via a wireless link;

a processing system operable to interpret the transformed image data, thereby generating pixel data;

a frame buffer operable to store pixel data; and a display engine operable to receive the pixel data from the processor and to render a display on the basis of the pixel data.

11. The device of claim 10, wherein the transmitter and receiver operate in accordance with a wireless communications standard.

12. The device of claim 10, wherein the bandwidth reduction parameters are communicated in accordance with a communications standard.

13. The device of claim 12, wherein the standard is the extended display identification standard.

14. The device of claim 10, wherein the display device is a projection device.

15. The device of claim 10, wherein the display device is a micromirror device-based projection device.

16. The method of claim 10, wherein the display device is a LCD-based projection device.

17. The device of claim 10, wherein the wireless link is a radio frequency (RF) link.

18. The device of claim 10, wherein the wireless link is an optical link.

* * * * *